Dec. 15, 1953   J. P. GOWLAND   2,662,442
COLLAPSIBLE PICTURE VIEWING DEVICE
Original Filed March 17, 1950

Inventor
JOHN P. GOWLAND
By Emery, Holcombe & Blair
Attorneys

Patented Dec. 15, 1953

2,662,442

UNITED STATES PATENT OFFICE 2,662,442

COLLAPSIBLE PICTURE VIEWING DEVICE

John Pinkney Gowland, Santa Barbara, Calif.

Original application March 17, 1950, Serial No. 150,333. Divided and this application August 3, 1951, Serial No. 240,235

Claims priority, application Great Britain March 18, 1949

6 Claims. (Cl. 88—1)

This application is a division of Serial No. 150,333 filed March 17, 1950. The invention relates to picture viewing devices. Devices embodying the invention may be constructed for viewing either transparencies, or opaque pictures by reflected light, either singly or stereoscopically.

An object of this invention is to provide improved picture viewing devices of a collapsible nature suitable for transmission through the post as postcards or letters.

Another object is to provide collapsible picture viewing devices which can be erected from the collapsed state by a single operation, and when so erected will be self-supporting without requiring a separate locking operation.

Yet another object is to provide picture viewing devices which can be readily collapsed from a self-supporting erected position.

Figure 1:
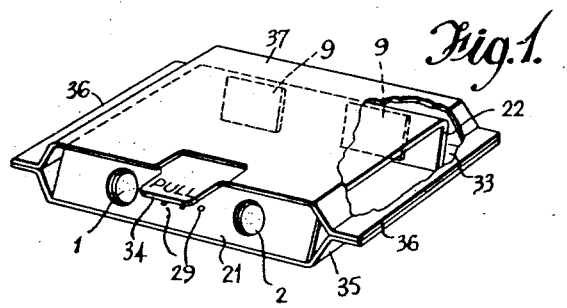
Figure 2:
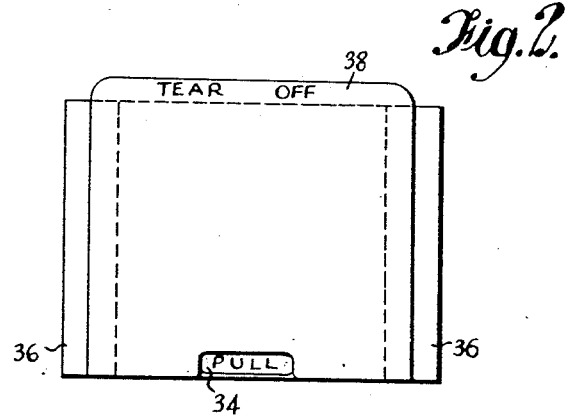
Figure 3:
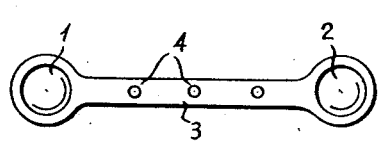

Still further objects and features of the invention will become apparent from the following description of an embodiment and the accompanying drawing, in which Fig. 1 is a perspective view showing one embodiment when almost fully erected;

Fig. 2 is a plan view showing this embodiment in the folded position for despatch, and Fig. 3 is a plan view showing an integral pair of lenses of synthetic resin which may be incorporated in the said embodiment.

Referring now to the drawing, a parallelogram structure 10, comprising a front wall 21 equipped with viewing lenses 1 and 2, a top wall 20, and a back wall 22 for supporting pictures 9 which are to be viewed, is hingedly attached to a base 33, for example by bent-over end strips. The base 33 is provided with hinged extension strips 35 at each side of the parallelogram structure 10, the width of each extension strip 35, being approximately equal to half the height of the front and rear wall portions 21 and 22, and each strip 35 being continued by a hinged side flap 36. A cover plate 37 of identical construction is placed over the base plate 33, the side flaps 36 of the two plates 33 and 37 being cemented or otherwise secured to each other, the whole structure being preferably made of cardboard-type sheet material, such as cardboard, card or stiff paper.

Fig. 1 illustrates the device in the course of erection, just before reaching its viewing position, the parallelogram structure being almost in its erect position thereby bringing the hinged extension strips 35 of the base and cover plates into alignment at each side of the parallelogram structure to form side walls which close the viewing device, while the cover plate is resiliently applied to the top wall 20 of the parallelogram structure, thus frictionally preventing movement of the top wall to collapse the structure. In order to despatch the device, the parallelogram structure is folded backwardly into a flat position upon the base 33 whereupon the base and cover plates can also be reduced to substantially flat form by pulling the two side flaps 36 outwardly.

Fig. 2 is a plan view of the device when folded, showing a gummed and perforated fastening strip 38 at the free edge of the base and cover plates. It will be apparent that when the two fastening strips 38 are stuck together, the device will be held in its flat position; when the device reaches the recipient, he will tear off the perforated strip 38, whereupon pulling of the tab 34 will erect the parallelogram structure 10. This structure will now be held upright by the base and cover plates 33, and 37 which, by the erection of the parallelogram structure, have been bent into the form shown in Fig. 1. The parallelogram structure 10 may if desired be formed with a complete bottom instead of two end flaps, the bottom being then secured to the base 33.

The device as illustrated is intended for use as a stereoscope, and has a pair of lenses which are formed as a single moulding or pressing as illustrated in Fig. 3. The two lenses 1 and 2 are integrally connected by a strip 3 which fixes the spacing between the lenses. This strip is provided with holes or with one-sided protuberances 4 serving to locate the lenses in position on the lens carrier 21 by registry in corresponding locating holes provided in the latter, as indicated at 29.

For the picture or pictures, transparencies on film or pictures on paper or card, in black and white or in colour, may be provided, which may be stuck on to the back wall 22 of the device. If the device is intended for viewing transparencies, the wall 22 is provided with one or more windows to admit light for transmission through the transparency or transparencies, and these window or windows may be covered with a film or other form of thin translucent material to act as a diffusing screen.

The invention is not limited in its scope to all the details of the embodiment hereinbefore described, and it should be understood that the positions of top and bottom parts may be interchanged by turning the device upside down without thereby departing from the scope of protection claimed in the accompanying claims.

I claim:

1. A collapsible picture viewing device comprising inner and outer mutually supporting collapsible structures, the inner structure including a top wall plate, a front wall plate having viewing aperture means, a bottom wall plate, and a rear wall plate for supporting a picture to be viewed, all hingedly connected to form a collapsible parallelogram structure, the outer structure comprising two side wall plates hingedly connected to the bottom wall plate at the two ends respectively along lines extending at right angles to said front and back wall plates, and a top cover plate approximately co-extensive with said top wall plate and hingedly connected to said side wall plates so as to form with the latter a frame structure which will frictionally support the parallelogram structure in its erect position, said side wall plates being each collapsible outwardly of said frame structure so as to permit, when the parallelogram structure is folded, said frame structure to be folded by collapsing said side walls without the risk of the side walls fouling the front and back walls.

2. A picture viewing device as claimed in claim 1, comprising a tab extending from the top wall plate beyond the hinge connection of the front wall member for manipulation to erect the parallelogram structure by pulling said tab.

3. A picture-viewing device comprising a flat rectangular bottom wall, a rectangular front wall hinged by one of its edges to said bottom wall along one edge thereof, a pair of viewing apertures in said front wall, a rectangular back wall for supporting pictures to be viewed, hinged by one of its edges to said bottom wall along a line parallel to the line of hinge connection of said front wall, a flat top wall to which the opposite edges of said front and back walls are hingedly connected so as to be spaced equally to the first-mentioned edges thereof to form a collapsible parallelogram structure, said front, back and top wall being of equal width, and said bottom wall projecting at each side beyond said front, back and top walls, and a top cover of the same width as said bottom wall, said top cover being hingedly connected to the bottom wall along the lateral edges thereof, and said bottom wall and top cover being each formed with edge portions adjacent each external edge thereof for hinge movement along lines connecting the lateral ends of the front and back walls to jointly form side wall members extending between the bottom wall and top cover for holding the top cover in frictional contact with the top wall when the parallelogram structure is in its erect viewing position.

4. A picture viewing device as claimed in claim 3, in which all said walls and said top cover consist of cardboard-type sheet material bent to form the hinge connections.

5. A picture viewing device as claimed in claim 4, in which the bottom wall and the top cover extend beyond the line reached by the upper edge of the back wall when the parallelogram structure is collapsed backwardly, means being provided for securing the projecting parts together to prevent the parallelogram structure from becoming erected accidentally.

6. A picture viewing device as claimed in claim 4, in which the bottom wall and top cover extend longitudinally beyond the outlines of the collapsed parallelogram structure, at least some of the projecting parts being coated with adhesive for securing projecting parts of the top cover to the bottom wall and thereby prevent the parallelogram structure from becoming erected accidentally.

JOHN PINKNEY GOWLAND.

References Cited in the file of this patent

UNITED STATES PATENTS

| Number | Name | Date |
| --- | --- | --- |
| 1,281,746 | Allen et al. | Oct. 15, 1918 |
| 2,321,004 | Branson | June 8, 1943 |